3,220,978
FLUORINE CONTAINING ORGANIC CARBONATES
Donald B. G. Jaquiss, Lenox, Mass., assignor to General
Electric Company, a corporation of New York
No Drawing. Filed May 29, 1963, Ser. No. 283,996
7 Claims. (Cl. 260—47)

This invention relates to polycarbonate resins and more particularly is concerned with a new class of carbonate polymers and copolymers derived from $\alpha,\alpha,\omega,\omega$ tetrahydroperfluorinated glycols.

Carbonate polymers derived from unsubstituted glycols have long been known in the art but have never achieved any technical importance due to their poor physical properties. Although the use of certain trihydrofluoro alcohols as chain terminators for polycarbonates is disclosed in U.S. Patent 3,036,040, carbonate polymers derived from perfluorinated glycols have not heretofore been prepared.

I have now discovered a new class of carbonate polymers characterized by good physical, chemical and electrical properties. In general, my new compositions have desirable tensile and impact characteristics, and in many cases possess rubber-like elastic properties. They are almost colorless and chemically resistant to a remarkable degree. On the other hand, they are readily soluble in certain organic solvents so that they may easily be made available in fiber or film form from solutions. They are also readily fabricated into films and parts by the usual molding and extrusion methods. Additionally, the copolymers of the present invention are specifically characterized in that they have an appreciably higher density, are far more water repellant, and have lower values of refractive indices and coefficients of friction than do the corresponding carbonate copolymers of the prior art prepared from unsubstituted glycols.

Briefly stated, the novel carbonate polymers and copolymers of my invention comprise recurring structural units derived from $\alpha,\alpha,\omega,\omega$ tetrahydroperfluoroglycols containing from 4 to 10 carbon atoms. In general, such glycols conform to the formula (I)    $HO-CH_2-(CF_2)_n-CH_2-OH$ where $n$ is a whole number from 2 to 8. The carbonate polymers of the invention may be prepared by reacting one or more of the perfluorinated glycols of Formula I with a carbonate precursor such as phosgene, a haloformate, or a carbonate ester. The carbonate polymers so prepared may be typified as possessing recurring structural units of the formula (II)
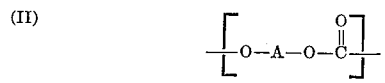

where A is the divalent radical of the perfluorinated glycol employed in the polymer producing reaction.

The carbonate copolymers of the invention are derived from one or more perfluorinated glycols of Formula I and a dihydric phenol and/or a dicarboxylic acid. The dihydric phenols which may be employed to provide such copolycarbonates are mononuclear or polynuclear aromatic compounds containing as functional groups, 2 hydroxyl radicals, each of which is attached directly to a carbon atom of an aromatic nucleus. Typical dihydric phenols are 2,2 bis-(4-hydroxyphenyl) propane; 2,2 bis-(4-hydroxyphenyl) pentane; 2,2 bis-(4-hydroxy 3 methylphenyl) propane; 2,2 bis-(4-hydroxy 3,5 dichlorophenyl) propane; 2,2 bis-(4-hydroxy 3,5 dibromophenyl) propane; 1,1 bis-(4-hydroxyphenyl) ethane; 4,4′ dihydroxy 3,3′ dichlorodiphenyl ether. A variety of additional dihydric phenols which may be employed to provide such carbonate copolymers are disclosed in U.S. Patent 2,999,835, Goldberg, assigned to the assignee of the present invention.

The dicarboxylic acids employed to provide the carbonate copolymers of the invention may be either aliphatic or aromatic in nature, and are characterized by the fact that both carboxylic acid groups are attached directly to carbon atoms of the carboxylic acid. Examples of suitable acids are phthalic, isophthalic, terephthalic, homophthalic, ortho, meta and para phenylene diacetic acid as well as nuclear aromatic acids such as diphenic acid and 1,4 naphthalic acid. Additional examples of dicarboxylic acids useful in the practice of the invention may be found in British Patent 870,095. It should be understood that, while throughout the present specification, reference is made to the use of dicarboxylic acids, it is not intended to exclude the use of their acid halides, salts or esters for the preparation of the carbonate copolymers of the invention.

As stated above, the carbonate polymers and copolymers of the present invention may be prepared by reacting one or more perfluorinated glycols of Formula I above (in combination with a dihydric phenol and/or a dicarboxylic acid in the event a copolymer is desired) with a carbonate precursor such as phosgene, a carbonate ester or a bis-haloformate.

When a carbonate ester is used as a carbonate precursor in the polymer forming reaction, the materials are reacted at temperatures from 100° C or higher for times varying from 1 to 15 hours. Under such conditions an ester interchange occurs between the carbonate ester and the glycol (and dihydric phenol and/or dicarboxylic acid in the event that a copolymer is to be prepared.) The ester interchange is preferably conducted in an inert atmosphere such as nitrogen or argon, for example. The carbonate ester useful in this connection may be aliphatic or aromatic in nature although aromatic esters, such as diphenyl carbonate, are preferred. Additional examples of carbonate esters which may be used are dimethyl carbonate, diethyl carbonate, phenylmethyl carbonate, phenyltolyl carbonate and di-tolyl carbonate.

A preferred method for preparing the carbonate polymers and copolymers of the invention involves the use of a carbonyl halide, such as phosgene, as the carbonate precursor. This method involves passing phosgene gas into a reaction mixture containing the perfluorinated glycol (and dihydric phenol and/or dicarboxylic acid) and an acid acceptor such as a tertiary amine (e.g., pyridine, dimethylaniline, quinoline etc.). The acid acceptor may be used undiluted or diluted with inert organic solvents as, for example, methylene chloride, chlorobenzene or 1,2 dichloroethane. Tertiary amines are advantageous since they are good solvents as well as acid acceptors during the reaction.

The temperature at which the carbonyl halide reaction proceeds may vary from about 0° C. to about 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend on the amount of dihydric material present. Generally speaking, one mole of phosgene will react with one mole of diol used to provide the polymer and two moles of HCl. Two moles of HCl are in turn "attached" by the acid acceptor present. The foregoing are herein refered to as stoichiometric or theoretical amounts.

A third method for preparing such carbonate polymers involves the phosgenation of an agitated suspension of the anhydrous alkali salt of the perfluorinated glycol used in a non-aqueous medium such as benzene, chlorobenzene and toluene. This reaction is illustrated by the addition of phosgene to a slurry of the sodium salt of 2,2,3,3,4,4 hexafluoropentanediol in an inert polymer solvent such as chlorobenzene. The organic solvent should preferably be a solvent for the polymer but need not necessarily be a good solvent for the reactants.

Generally speaking, the bis-haloformates of perfluorinated glycols, such as the bishaloformate of 2,2,3,3,4,4 hexafluoropentanediol, for example may be substituted for phosgene as the carbonate precursor in any of the methods described above.

In each of the above solution methods of preparation, the carbonate polymer emerges from the reaction in either a true or pseudo solution whether aqueous base or pyridine is used as the acid acceptor. The polymer may be precipitated from the solution by adding a polymer non-solvent such as heptane or isopropanol. Alternatively, the polymer solution may be heated to evaporate the solvent.

In order that those skilled in the art may better understand how the present invention may be practiced, the following examples are given by way of illustration and not by way of limitation. All parts and percentages are by weight unless otherwise noted.

EXAMPLE 1

This example illustrates the preparation of a polycarbonate of an $\alpha,\alpha,\omega,\omega$ tetrahydroperfluoroglycol.

Twenty-eight and one-half parts of phosgene were added to 5 parts of 2,2,3,3,4,4 hexafluoropentanediol in 535 parts of methylene chloride and 60 parts of pyridine over a period of 75 minutes with vigorous stirring. The resultant viscous solution was washed with dilute hydrochloric acid to remove excess pyridine, and finaly with water until the raffinate was neutral to pH paper. The yield of the carbonate polymer produced was 58.3 parts. This material, melting point 58–60° C., had an intrinsic viscosity (measured in dioxane at 30° C.) of 0.30. Its infrared spectrum exhibited a strong carbonyl absorption at $5.63\mu$.

EXAMPLE 2

This example illustrates the preparation of a copolycarbonate of a dihydric phenol and a tetrahydroperfluoroglycol.

102.2 parts of 2,2 bis-(4-hydroxyphenyl) propane (95 mole percent) and 5 parts of 2,2,3,3,4,4 hexafluoropentanediol (5 mole percent) were phosgenated adiabatically in 86 parts of pyridine and 920 parts of methylene chloride at a nominal phosgene rate of 1 part per minute to a definite end point. The resultant polymer solution was washed with water and the copolymer precipitated with methanol, and subsequently dried at 125° C. overnight. 112 parts of the copolymer were thus obtained. This sample was set aside and labeled as sample A.

EXAMPLE 3

Example 2 was repeated except that 96.8 parts of 2,2-bis-(4-hydroxyphenyl) propane (90 mole percent) and 10 parts of 2,2,3,3,4,4 hexafluoropentanediol (10 mole percent) were substituted for the amounts used in that example. 92 parts of the copolymer so obtained were set aside and labeled sample B.

EXAMPLE 4

Example 2 was again repeated with the substitution of 86.2 parts of 2,2 bis-(4-hydroxyphenyl) propane (80 mole percent) and 20 parts of 2,2,3,3,4,4 hexafluoropentanediol for the amounts used in that example. 105.8 parts of the copolymer so obtained were set aside and labeled sample C.

The physical properties of the copolymers prepared in Examples 2, 3 and 4 are shown in Table I below.

*Table I*

| Sample | $\eta$red Dioxane at 30° C. | Softening Point, ° C. | Tensile Heat Distortion Temp., ° C. | Yield Strength, p.s.i. | Tensile Strength, p.s.i. | Modulus, p.s.i. | Elongation, percent |
|---|---|---|---|---|---|---|---|
| A | 0.52 | 209 | 147 | 8,500 | 7,000 | 175,000 | 17 |
| B | 0.516 | 197 | 140 | 8,600 | 8,600 | 190,000 | 14 |
| C | 0.45 | 178 | 116 | 8,000 | 6,200 | 190,000 | 27 |

EXAMPLE 5

This example illustrates the preparation of a copolymer of a dicarboxylic acid and an $\alpha,\alpha,\omega,\omega$ tetrahydroperfluoroglycol.

A mixture of 8.3 parts (0.05 mole) of isophthalic acid and 31.8 parts (0.15 mole) of 2,2,3,3,4,4 hexafluoropentanediol in 267 parts of methylene chloride and 55 parts of pyridine were phosgenated at reflux at a rate of 1 part of phosgene per minute for 22 minutes. The reaction mixture was washed with water and then precipitated with methanol. The copolymer obtained was redissolved in methylene chloride, concentrated on a steam bath and dried at 125° C. overnight. The resultant copolymer (31 parts) had a reduced viscosity of 0.19 in dioxane. The infrared scan (film) showed two carbonyl bands at 5.60 and $5.70\mu$, characteristic of estercarbonates.

While the foregoing examples specifically illustrate the use of 2,2,3,3,4,4 hexafluoropentanediol in the preparation of the carbonate polymers and copolymers of the invention, it will be appreciated by those skilled in the art that any $\alpha,\alpha,\omega,\omega$ tetrahydroperfluoroglycol containing from 4 to 10 carbon atoms may be utilized to provide the carbonate polymers of the invention.

Generally speaking, the carbonate polymers of the invention may be employed as high temperature lubricants, are excellent wax and polish additives, and promote water repellency and lubricity. Specifically, they may be used as additives to aromatic polycarbonate resins for the purpose of imparting improved lubricity and flame retardancy. The copolymers obtained from the perfluorinated glycols and dihydric phenols and/or dicarboxylic acids may be employed to provide molded and extruded parts, blown films and extruded sheets having acceptably high heat distortion temperatures and tensile properties.

What I claim as new and desire to secure by Letters Patent of the United States is:

1. A polycarbonate of an $\alpha,\alpha,\omega,\omega$ tetrahydroperfluoroglycol containing from 4 to 10 carbon atoms.
2. A copolycarbonate of a dihydric phenol and an $\alpha,\alpha,\omega,\omega$ tetrahydroperfluoroglycol containing from 4 to 10 carbon atoms.
3. A copolycarbonate of a dicarboxylic acid and an $\alpha,\alpha,\omega,\omega$ tetrahydroperfluoroglycol containing from 4 to 10 carbon atoms.
4. A polycarbonate of 2,2,3,3,4,4 hexafluoropentanediol.
5. The copolycarbonate of claim 2 in which the dihydric phenol is 2,2 bis-(4-hydroxyphenyl) propane.
6. The copolycarbonate of claim 3 in which the dicarboxylic acid is isophthalic acid.
7. A copolycarbonate of 2,2 bis-(4-hydroxyphenyl) propane and 2,2,3,3,4,4 hexafluoroupentanediol.

No references cited.

MURRAY TILLMAN, *Primary Examiner.*

UNITED STATES PATENT OFFICE
CERTIFICATE OF CORRECTION

Patent No. 3,220,978                           November 30, 1965

Donald B. G. Jaquiss

It is hereby certified that error appears in the above numbered patent requiring correction and that the said Letters Patent should read as corrected below.

Column 3, line 28, for "5" read -- 53 --; column 4, Table 1, in the heading to the second column, for "ned" read -- ŋred --.

Signed and sealed this 27th day of September 1966.

(SEAL)
Attest:

ERNEST W. SWIDER
Attesting Officer

EDWARD J. BRENNER
Commissioner of Patents